(12) United States Patent
Smith et al.

(10) Patent No.: US 6,578,078 B1
(45) Date of Patent: Jun. 10, 2003

(54) METHOD FOR PRESERVING REFERENTIAL INTEGRITY WITHIN WEB SITES

(75) Inventors: Michael D. Smith, Kirkland, WA (US); Eric Hennings, Seattle, WA (US); Christine Walpole McKee, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/285,530

(22) Filed: Apr. 2, 1999

(51) Int. Cl.[7] .................. G06F 17/30; G06F 15/173
(52) U.S. Cl. ................ 709/224; 707/513; 707/10
(58) Field of Search .............................. 709/201, 202, 709/203, 217, 218, 219, 224, 225, 226, 229; 707/500.1, 501.1, 513, 10

(56) References Cited

U.S. PATENT DOCUMENTS 5,761,683 A  *  6/1998  Logan et al. ............... 707/513
6,240,455 B1 *  5/2001  Kamasaka et al. ......... 709/200
6,253,204 B1 *  6/2001  Glass et al. ................ 707/10
6,321,242 B1 * 11/2001  Fogg et al. ................. 707/10

* cited by examiner

*Primary Examiner*—Dung C. Dinh
(74) *Attorney, Agent, or Firm*—Ronald M. Anderson

(57) ABSTRACT

The integrity of uniform resource locator (URL) references within web sites are maintained when changes occur in the locations where resources referenced by URLs are stored. A Referential Preservation Engine (RPE) maintains a database in which the location of web site documents and reference information are stored and updates various URL hyperlink references contained in the web pages on the site so that users can locate documents that have been moved to new storage locations. The RPE can also update links to external web sites by communicating with an RPE running on each external site. The RPE on the external site keeps track of the movement of linked documents on the sites and passes information pertaining to the new location of the linked documents to the local site, whereupon the links on the local web site pages are updated to reflect the new storage locations. The RPE also can track usage of a user's favorite sites and/or documents that are stored in an Internet browser and update the URL references for these favorites when the resources they are mapped to are moved (or renamed).

9 Claims, 10 Drawing Sheets

```
200
    DOCUMENT URL: HTTP://WWW.MICROSOFT.COM/FIGURE1.HTML

<HTML>
    <HEAD>
    <TITLE>FIGURE 1</TITLE>
    </HEAD>
    <BODY>
202 THE NEXT LINE HAS THE BASE ELEMENT.
    <BASE HREF=HTTP://WWW.ACME.COM/PRESS/RELEASE1.HTML>
204 THE NEXT LINE HAS A HYPERTEXT LINK WITH AN ABSOLUTE URL.
    <A HREF=HTTP://WWW.RESEARCH.COM/STATUS/REPORT.HTML>
206 THE NEXT LINE HAS A HYPERTEXT LINK WITH A RELATIVE URL.
    <A HREF=RELEASE2.HTML>
    </BODY>
    </HTML>
208
    THE RELATIVE URL REFERS TO: HTTP://WWW.ACME.COM/PRESS/RELEASE2.HTML
```

*FIG. 7A*

```
210
    DOCUMENT URL: HTTP://WWW.MICROSOFT.COM/FIGURE2.HTML

<HTML>
    <HEAD>
    <TITLE>FIGURE 2</TITLE>
    </HEAD>
    <BODY>
    THIS DOCUMENT HAS NO BASE ELEMENT.
212 THE NEXT LINE HAS A HYPERTEXT LINK WITH AN ABSOLUTE URL.
    <A HREF=HTTP://WWW.RESEARCH.COM/STATUS/REPORT.HTML>
214 THE NEXT LINE HAS A HYPERTEXT LINK WITH A RELATIVE URL.
    <A HREF=RELEASE2:HTML>
    </BODY>
    </HTML>
216
    THE RELATIVE URL REFERS TO: HTTP://WWW.MICROSOFT.COM/RELEASE2.HTML
```

*FIG. 7B*

METHOD FOR PRESERVING REFERENTIAL INTEGRITY WITHIN WEB SITES

FIELD OF THE INVENTION

The present invention generally pertains to locating documents via embedded links on computer networks in general, and more specifically, to the use of uniform resource locator (URL) hyperlinks in documents on the Internet and on other types of networks.

BACKGROUND OF THE INVENTION

An on-line information system typically includes one or more computer systems (the servers) that makes information available so that other computer systems (the clients) can access the information. Each server manages access to the information, which can be structured as a set of independent on-line services. A server and client communicate via messages conforming to a communication protocol and sent over a communication channel such as a computer network or through a dial-up connection.

Typical uses for on-line services include document viewing, electronic commerce, directory lookup, on-line classified advertisements, reference services, electronic bulletin boards, document retrieval, electronic publishing, keyword searching of documents, technical support for products, and directories of on-line services. The on-line service may make the information available free of charge, or for a fee, and may be on publicly accessible or private computer systems.

Information sources managed by the server may include files, databases, and applications on the server system or on an external computer system. The information that the server provides may simply be stored on the server, may be converted from other formats manually or automatically, may be computed on the server in response to a client request, may be derived from data and applications on the server or other machines, or may be derived by any combination of these techniques.

The user of an on-line service typically uses a specialized computer program, such as a browser, that is executed on the client system to access the information managed by an on-line service. Possible user capabilities include viewing, searching, downloading, printing, editing, and filing the information managed by the server. The user may also price, purchase, rent, or reserve services or goods offered through the on-line service.

An exemplary on-line service for catalog shopping might work as follows. A user running a program on a client system requests a connection to the catalog shopping service using a service name that either is well known or can be found in a directory. The request is received by the server employed by the catalog shopping service, and the server returns an introductory document that asks for an identifier and password. The client program displays this document, the user fills in an identifier and password that were assigned by the service in a previous visit, and the information is sent to the server. The server verifies the identifier and password against an authorization database, and returns a menu document that is then presented to the user. Each time the user selects a menu item, the selection is sent to the server, and the server responds with the appropriate new page of information, possibly including item descriptions or prices that are retrieved from a catalog database. By selecting a series of menu items, the user navigates to the desired item in the catalog and requests that the item be ordered. The server receives the order request, and returns a form to be completed by the user to provide information about shipping and billing. The user response is returned to the server, and the server enters the order information into an order database.

On-line services are available on the World Wide Web (WWW), which operates over the global Internet. The Internet is a publicly accessible wide area network (WAN) comprising a multitude of generally unrelated computer networks that are interconnected. Similar services are available on private networks called "Intranets" that may not be connected to the Internet, and through local area networks (LANs). The WWW and similar private architectures provide a "web" of interconnected document objects. On the WWW, these document objects are located at various sites on the global Internet. A more complete description of the WWW is provided in "The World-Wide Web," by T. Berners-Lee, R. Cailliau, A. Luotonen, H. F. Nielsen, and A. Secret, *Communications of the ACM*, 37 (8), pp. 76–82, August 1994, and in "World Wide Web: The Information Universe," by Berners-Lee, T., et al., in *Electronic Networking: Research, Applications and Policy*, Vol. 1, No. 2, Meckler, Westport, Conn., Spring 1992.

Among the types of document objects in an on-line service are documents and scripts. Documents that are published on the WWW are written in the Hypertext Markup Language (HTML). This language is described in *HyperText Markup Language Specification*—2.0, by T. Berners-Lee and D. Connolly, RFC 1866, proposed standard, November 1995, and in "World Wide Web & HTML," by Douglas C. McArthur, in *Dr. Dobbs Journal*, December 1994, pp. 18–20, 22, 24, 26 and 86. Many companies also are developing their own enhancements to HTML. HTML documents are generally static, that is, their contents do not change over time unless modified by a service or web site developer. HTML documents can be created using programs specifically designed for that purpose, such as Microsoft Corporation's FRONTPAGE™ Web Page publishing program, by editing a text file, or by executing a script file.

The HTML language is used for writing hypertext documents, which are more formally referred to as Standard Generalized Markup Language (SGML) documents that conform to a particular Document Type Definition (DTD). An HTML document includes a hierarchical set of markup elements; most elements have a start tag, followed by content, followed by an end tag. The content is a combination of text and nested markup elements. Tags, which are enclosed in angle brackets ('<' and '>'), indicate how the document is structured and how to display the document, as well as destinations and labels for hypertext links. There are tags for markup elements such as titles and headers, text attributes such as bold and italic, lists, paragraph boundaries, links to other documents or other parts of the same document, in-line graphic images, and for many other features.

The following lines of HTML briefly illustrate how the language is used:

Some words are <B>bold</B>, others are <I>italic</I>. Here we start a new paragraph.<P>Here's a link to the <A HREF="http://www.microsoft.com">Microsoft Corporation </A>homepage.

This sample document is a hypertext document because it contains a hypertext "link" (hyperlink) to another document, in the line that includes "HREF=." The format of this link is described below. A hypertext document may also have a link to other parts of the same document. Linked documents may generally be located anywhere on the Internet. When a user is viewing the document using a client program called a Web browser (described below), the links are displayed as highlighted words or phrases. For example, using a Web browser, the sample document above might be displayed on the user's screen as follows:

Some words are bold, others are italic. Here we start a new paragraph.

Here's a link to Microsoft Corporation homepage.

In the Web browser, the link may be selected, for example, by clicking on the highlighted area with a mouse. Typically, the screen cursor noticeably changes (shape and/or color) when positioned on a hypertext link. Selecting a link will cause the associated document to be displayed. Thus, clicking on the highlighted text "Microsoft Corporation" would fetch and display the associated homepage for that entity.

The HTML language also provides a mechanism (the image or "IMG" element) enabling an HTML document to include an image that is stored as a separate file. When the end user views the HTML document with a browser program, the included image is displayed to the user as part of the document, at the point where the image element occurred in the document.

Another kind of document object in a web is a script. A script is an executable program or a set of commands stored in a file that can be run by a server program called a Web server (described below) to produce an HTML document that is then returned to the Web browser. Typical script actions include running library routines or other applications to fetch information from a file or a database, or initiating a request to obtain information from another machine, or retrieving a document corresponding to a selected hypertext link. A script may be run on the Web server when, for example, the end user selects a particular hypertext link in the Web browser, or submits an HTML form request. Scripts are usually written by a service developer in an interpreted language such as Basic, Practical Extraction and Report Language (Perl), or Tool Control Language (Tcl) or one of the Unix operating system shell languages, but they also may be written in more complex programming languages such as "C" and then compiled to produce an executable program. Programming in Tcl is described in more detail in *Tcl and the Tk Toolkit*, by John K. Ousterhout, Addison-Wesley, Reading, Mass., USA, 1994. Perl is described in more detail in *Programming in Perl*, by Larry Wall and Randal L. Schwartz, O'Reilly & Associates, Inc., Sebastopol, Calif., USA, 1992.

Each document object in a web has an identifier called a Universal Resource Identifier (URI). These identifiers are described in more detail in T. Berners-Lee, "*Universal Resource Identifiers in WWW: A Unifying Syntax for the Expression of Names and Addresses of Objects on the Network as used in the World-Wide Web*," RFC 1630, CERN, June 1994; and T. Berners-Lee, L. Masinter, and M. McCahill, "*Uniform Resource Locators (URL)*," RFC 1738, CERN, Xerox PARC, University of Minnesota, December 1994. A URI allows any object on the Internet to be referred to by name or address, such as in a link in an HTML document as shown above. There are two types of URIs: Universal Resource Name (URN) and Uniform Resource Locator (URL). A URN references an object by name within a given name space. The Internet community has not yet defined the syntax of URNs. A URL references an object by defining an access algorithm using network protocols. An example of a URL is "http://www.microsoft.com". A URL has the syntax "scheme://host:port/path?search" where "scheme" identifies the access protocol (such as HTTP, FTP, or GOPHER);

"host" is the Internet domain name of the machine that supports the protocol, and comprises the fully qualified domain name of a network host, or its IP address as a set of four decimal digit groups separated by ".". Fully qualified domain names take the form of a sequence of domain labels separated by ".", each domain label starting and ending with an alphanumerical character and possibly also containing "-" characters. The rightmost domain label will never start with a digit, though, which syntactically distinguishes all domain names from the IP addresses (See Section 3.5 of RFC 1034 and Section 2.1 of RFC 1123).

"port" is the transmission control protocol (TCP) port number of the appropriate server (if different from the default);

"path" is a scheme-specific identification of the object. It supplies the details of how the specified resource can be accessed. Note that the "/" between the host (or port) and the path is NOT part of the path; and "search" contains optional parameters for querying the content of the object.

URLs are also used by web servers and browsers on private computer systems, Intranets, or networks, and not just for the WWW.

The HTTP URL scheme is used to designate Internet resources that may be accessed using HTTP. The HTTP URL has the syntax "http://<host>:<port>/<path>?<searchpart>", where <host> and <port> are as described above. If :<port> is omitted, the port defaults to 80. No user name or password is allowed. <path> is an HTTP selector, and <searchpart> is a query string. The <path> is optional, as is the <searchpart> and its preceding "?". If neither <path> nor <searchpart> is present, the "/" may also be omitted. Within the <path> and <searchpart> components, "/", ";", "?" are reserved. The "/" character may be used within HTTP to designate a hierarchical structure.

There are generally two types of URLs that may be used in the hypertext link: absolute URLs and relative URLs. An absolute URL includes a protocol identifier, a machine name, and an optional HTTP port number. A relative URL does not include a protocol identifier, machine name or port, and must be interpreted relative to some known absolute URL called the base URL. The base URL is used to determine the protocol identifier, machine name, optional port, and base directory for a relative URL. For further discussion of URL format and usage, see the document "Uniform Resource Locators," Internet Request for Comments (RFC) 1738, by T. Berners-Lee, L. Masinter, M. McCahill, University of Minnesota, December 1994. For further discussions of relative URL format and usage, see "Relative Uniform Resource Locators," RFC 1808, by R. Fielding, University of California, Irvine, June 1995.

A hypertext link to an electronic document is specified by one of several HTML elements. One of the parameters of an HTML element for a hypertext link is the URL that serves as the identifier for the target of the link. An HTML document may have a base element defining an absolute URL that specifies the base URL for that document. If the document has no base element, then the absolute URL of the document is used as the base URL. The base element provides a base address for interpreting relative URLs when the document is read out of context.

For example, FIG. 7A shows text with a document URL 200, a base element 202, a hypertext link with an absolute URL 204, and a hypertext link with a relative URL 206, which is evaluated with respect to base element 202 to produce a resulting URL 208. As an additional example, FIG. 7B shows text with a document URL 210, no base element, a hypertext link with an absolute URL 212, and a hypertext link with a relative URL 214, which is evaluated with respect to document URL 210 to produce a resulting URL 216.

A site at which documents are made available to network users is called a "Web site" and must run a "Web server" program to provide access to the documents. A Web server program is a computer program that allows a computer on the network to make documents available to the rest of the WWW or to a private network. The documents are often hypertext documents written in the HTML language, but may be other types of document that include other types of objects as well, such as images, audio, and/or video data. The information that is managed by the Web server includes hypertext documents that are stored on the server or are dynamically generated by scripts on the Web server. Several Web server software packages exist, such as the *Conseil Europeen pour la Recherche Nucleaire* (CERN, the European Laboratory for Particle Physics) server or the National Center for Supercomputing Applications (NCSA) server. Web servers have been implemented for several different platforms, including the Sun SPARC II™ workstation running the Unix operating system, and personal computers with the Intel PENTIUM™ processor running the Microsoft MS-DOS™ operating system and the Microsoft WINDOWS™ graphic user interface operating environment.

Web servers also use a standard interface for running external programs, such as the Common Gateway Interface (CGI) or ISAPI. CGI is described in more detail in *How to Set Up and Maintain a Web Site*, by Lincoln D. Stein, Addison-Wesley, August 1995. A gateway is a program that handles incoming information requests and returns the appropriate document or generates a document dynamically. For example, a gateway might receive queries, look up the answer in a database to provide a response, and translate the response into a page of HTML so that the server can send the response to the client. A gateway program may be written in a language such as "C" or in a scripting language such as Perl or Tcl or one of the Unix operating system shell languages. The CGI standard specifies how the script or application receives input and parameters, and specifies how output should be formatted and returned to the server.

For security reasons, a Web server machine may limit access to files. To control access to files on the Web server, the Web server program running on the server machine may provide an extra layer of security above and beyond the normal file system and login security procedures of the operating system on the server machine. The Web server program may add further security rules such as: (a) optionally requiring input of a user name and password, completely independent of the normal user name and passwords that the operating system may maintain on user accounts; (b) allowing groups of users to be identified for security purposes, independent of any user group definitions defined in the security components of the operating system; (c) access control for each document object such that only specified users (with optional passwords) or groups of users are allowed access to an object, or so that access is only allowed for clients at specific network addresses, or some combination of these rules; (d) allowing access to the document objects only through a specified subset of the possible HTTP methods; and (e) allowing some document objects to be marked as HTML documents, others to be marked as executable scripts that will generate HTML documents, and others to be marked as other types of objects such as images. Access to the on-line service document objects via a network file system would not conform to the security features of the Web server program and would provide a way to access documents outside of the security provided by the Web server. The Web server program also typically maps document object names that are known to the client to file names on the server file system. This mapping may be arbitrarily complex, and any author or program that tries to access documents on the Web server directly would need to understand this name mapping.

A user (typically using a machine other than the machine used by the Web server) who wishes to access documents available on the network at a Web site must run a Web browser program. The combination of the Web server and Web browser communicating using an HTTP protocol over a computer network is referred to herein as a "web architecture." The Web browser program allows the user to retrieve and display documents from Web servers. Some of the popular Web browser programs are: NAVIGATOR™ browser from NetScape Communications Corp., of Mountain View, Calif.; MOSAIC™ browser from the National Center for Supercomputing Applications (NCSA); WIN-WEB™ browser, from Microelectronics and Computer Technology Corp. of Austin, Tex.; and Internet Explorer from Microsoft Corporation of Redmond, Wash. Web browsers have been developed to run on different platforms, including personal computers with the Intel Corporation PENTIUM™ processor running Microsoft Corporation's MS-DOS™ operating system and Microsoft Corporation's WINDOWS™ graphic user interface environment, and Apple Corporation's MACINTOSH™ personal computers, and other independent operating systems, such as Linux.

The Web server and the Web browser communicate using the Hypertext Transfer Protocol (HTTP) message protocol and the underlying transmission control protocol/Internet protocol (TCP/IP) data transport protocol of the Internet. HTTP is described in *Hypertext Transfer Protocol—HTTP/1.0*, by T. Berners-Lee, R. T. Fielding, H. Frystyk Nielsen, Internet Draft Document, Oct. 14, 1995. In HTTP, the Web browser establishes a connection to a Web server and sends an HTTP request message to the server. In response to an HTTP request message, the Web server checks for authorization, performs any requested action, and returns an HTTP response message containing an HTML document in accord with the requested action, or an error message. The returned HTML document may simply be a file stored on the Web server, or may be created dynamically using a script called in response to the HTTP request message. For instance, to retrieve a document, a Web browser may send an HTTP request message to the indicated Web server, requesting a document by reference to the URL of the document. The Web server then retrieves the document and returns it in an HTTP response message to the Web browser. If the document has hypertext links, then the user may again select one of those links to request that a new document reference by the selected link be retrieved and displayed.

As another example, a user may fill in a form requesting a database search. In response, the Web browser will send an HTTP request message to the Web server including the name of the database to be searched, the search parameters, and the URL of the search script. The Web server calls a search program, passing in the search parameters. The program examines the parameters and attempts to answer the query, perhaps by sending the query to a database interface. When the program receives the results of the query, it constructs an HTML document that is returned to the Web server, which then sends it to the Web browser in an HTTP response message.

Request messages in HTTP contain a "method name" indicating the type of action to be performed by the server, a URL indicating a target object (either document or script) on the Web server, and other control information. Response messages contain a status line, server information, and possible data content. The Multipurpose Internet Mail Extensions (MIME) specification defines a standardized protocol for describing the content of messages that are passed over a network. HTTP request and response messages use MIME header lines to indicate the format of the message. MIME is described in more detail in *MIME (Multipurpose Internet Mail Extensions): Mechanisms for Specifying and Describing the Format of Internet Message Bodies*, Internet RFC 1341, June 1992.

Internet users typically access web resources through one of three ways: (1) by directly entering (e.g., typing in) the URL for the resource, such as http://www.Microsoft.com; (2) through a reference in another document, such as a hyperlink; or (3) through a separate storage of the link's URL, such as a listing under a "Favorites" (or Bookmarked) menu item in a browser, a folder view of the browser's history, or the results displayed by an Internet search engine. These methods all work equally well as long as the URL for the linked document or site doesn't change. Unfortunately, changes in web pages and sites are very common, and URL's for sites and documents are constantly being changed. When a hyperlink's URL no longer points to its (previously) associated resource (e.g., a web page), the hyperlink is said to be "broken." In such instances, the URL entry provided by any of the foregoing methods will not locate the resource it was previously mapped to unless there is some provision for forwarding the user to the new URL. For instance, the author of a site can associate some HTML code with the previous URL that automatically forwards a user traversing the link to the new URL. Unfortunately, there is no facility built into the Internet's URL referential addressing scheme that automatically remaps the locations of web resources. As a result, it is very common for users to receive a "Document/Page not Found" error when a web page has been moved, and the prior URL is no longer valid.

Conventional web authoring tools only provide a partial solution to the foregoing resource relocation problem. For example, Microsoft Corporation's FRONTPAGE™ maintains lists of links within a currently authored web site, and ensures that when pages are moved, the links to the moved pages that are located in other pages within the same web site are updated. For instance, if a FRONTPAGE™ user is authoring a web site and moves one of the documents, all of the hyperlinks within the site are automatically updated to map to the page's new location. However, this does not address the other commonly encountered problems concerning broken hyperlinks discussed above, such as when the web page is linked through an external reference (i.e., external relative to the web site). In particular, it would be advantageous to provide a scheme that automatically updates broken URL references so that the resources previously associated with the broken URLs can be more easily located.

SUMMARY OF THE INVENTION

The invention addresses many of the problems associated with changes in the locations of resources stored on a site through a method for dealing with broken hyperlinks to the resources that have been moved. It should be noted that the term "moved" as used herein with regard to resources or documents (both in the specification and in the claims that follow) includes the renaming of such resources or documents, since renaming a resource or document has the effect of changing its storage location. The present invention addresses any change in the full path to a resource that breaks a hyperlink to that resource and thus addresses a change in the storage location of a resource or a change in the name of the resource. The system and method are preferably implemented by a set of program modules that comprise a Referential Preservation Engine (RPE). The RPE program modules preferably are part of one or more application programs that are used in a web page authoring environment.

According to a first aspect of the invention, the RPE implements a method for maintaining the integrity of hyperlinks within a web site. The hyperlinks reference the locations of resources such as web page documents on external (remote) servers that can be accessed over a private wide area network or a public wide area network such as the Internet. It is common for resources to be moved within web sites when the sites are being developed or as part of routine maintenance of the sites. An RPE running on an external server tracks the movement of resources on that server and saves changes in the locations of resources as redirection data. The redirection data preferably include the previous and new location for each of the moved resources. The RPE also tracks the usage of hyperlinks employed to retrieve the moved resources, recording the addresses of web page sites that follow hyperlinks to the external site. The redirection data and hyperlink usage data are preferable stored as the redirection data in files that are associated with the moved resources. When a resource on an external server is moved, or on a periodic basis, the external server sends the redirection data to the servers that have referred the links based on the hyperlink usage data. An RPE running on one of these referring servers can then update the hyperlinks in the documents on that site to reflect the new location of the moved resources.

According to a second aspect of the invention, the RPE provides a method for updating URL references that are stored in browsers. A browser runs on a client computer and typically contains a list of web sites or documents that are marked as favorites by a user. These favorites are typically stored as URL references that are mapped to the site or document the user desires to save a mark for. When these web sites are initially marked as favorites, or optionally, when a user uses one of these favorite URLs to visit a web site or page, the browser sends a message identifying the client's address to the server where the favorite site or page is located. Web sites that are running the RPE compile these messages, and store them in a database. When resources are moved on these web sites, the URLs for the resources typically must be changed. The RPE for the site tracks the movement of the resources on that site and the associated changes to the URLs and sends messages containing the new location of the moved resources to the browsers in the client computers that have previously sent messages to that server concerning use or storage of the URL that previously was mapped to the moved resource. The browser in the client computer can then update the URL reference for the favorite site or document based on this information.

According to another aspect of the invention, the RPE provides a method for maintaining a web site that comprises multiple web page documents that are stored on a server. Each document has a content and an original URL reference that is mapped to a location on the server to where the document is originally stored. As the web site is developed or maintained, various documents are moved from their original locations to new locations or deleted altogether.

These movements and deletions are tracked by an RPE running on the server. For each of the moved or deleted documents, the RPE applies predefined rules to determine if tracking changes in the location of the document is justified. If the document fails to meet these predefined rules, and if the document is moved within the site or deleted, links to the document that are contained in the site's various other documents are nevertheless updated, but redirection data for the document are not maintained. Conversely, if the document meets the predefined rules, a redirection page is created, if possible. The redirection page preferably contains a URL stub with HTML code that redirects a browser to the new location for the document when a user tries to access the document with the document's original (and no longer valid) URL. The redirection page may optionally display a message for a predetermined amount of time indicating that a new URL for the link has been provided, and may also include a hyperlink to the new location for the document. As with the documents that fail to meet the predefined rules, links to documents that do meet the predefined rules and have been moved or deleted are updated in the site's various other documents.

The predefined rules may specify a minimum predefined number of times that a page must have been visited, a predetermined minimum rate of users accessing a document, whether the page has been marked by its author as requiring redirection data, and whether the page has been marked by a browser as a favorite.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 7A is a sample HTML document with a base URL showing examples of a hyperlink using a relative URL, and a hyperlink using an absolute URL;

FIG. 7B is a sample HTML document without a base URL, showing examples of a hyperlink using a relative URL, and a hyperlink using an absolute URL;

DESCRIPTION OF THE PREFERRED EMBODIMENT

The present invention enables the integrity of URL references on web sites to be maintained to prevent broken links, where appropriate. The system and method are preferably implemented by a set of program modules that comprise a Referential Preservation Engine (RPE). The program modules preferably are part of one or more application programs executed on a personal computer and used in providing a web page authoring environment. The following discussion pertains to the use of the RPE in Microsoft Corporation's FRONTPAGE™ web page authoring program. It should be noted that this is not meant to be limiting, as the RPE can likely be applied to other web page authoring programs as well.

Figure 8:
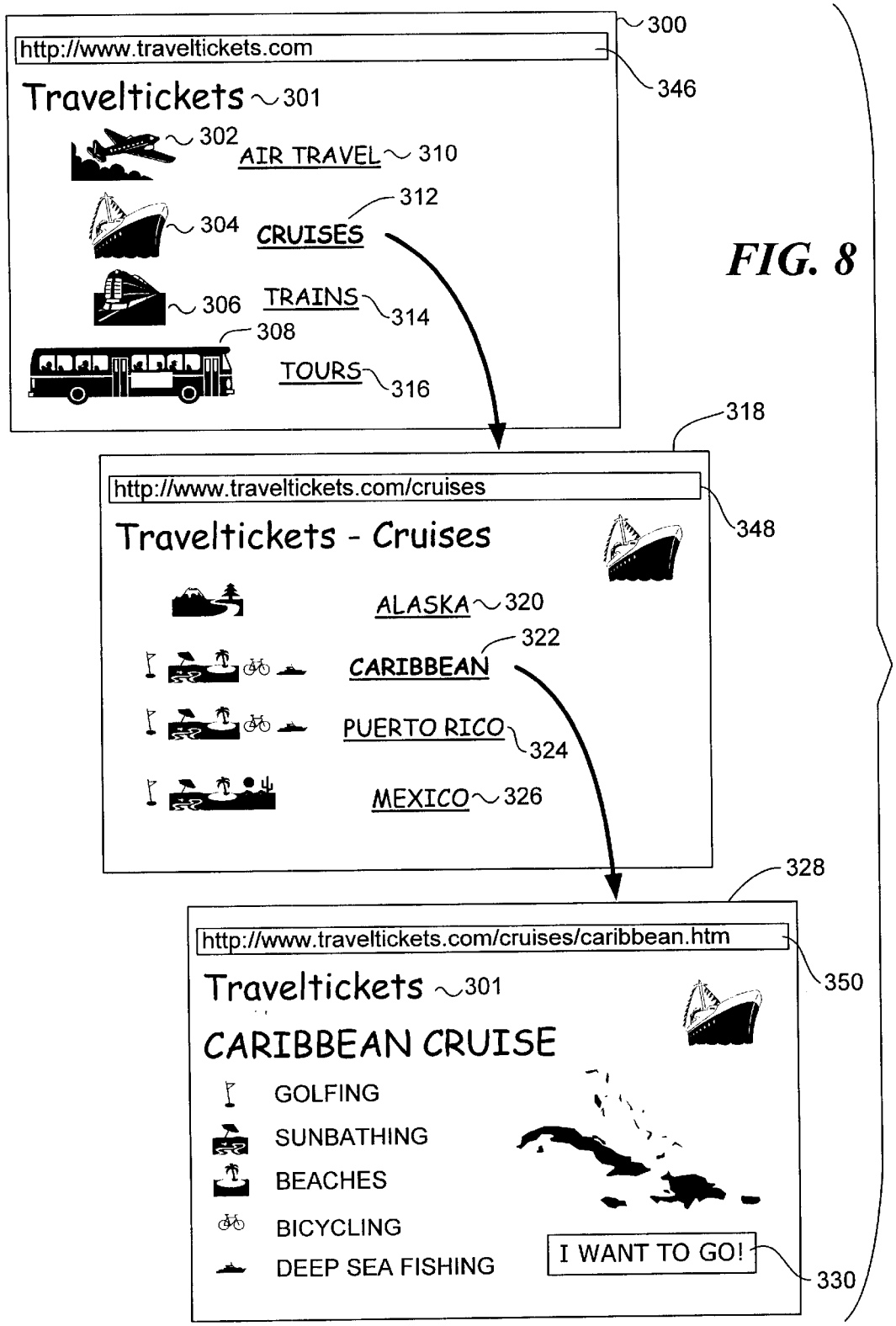
FIG. 8 is a schematic diagram illustrating three web pages on an exemplary web site.

As discussed above, web sites on the Internet typically comprise multiple HTML documents that are stored on a web server. The pages for a web site are generally organized in a structured hierarchy based on content level. For example, if a user clicks on a hyperlink to a travel agency site, such as the "www.traveltickets.com" site shown in FIG. 8, that site's homepage 300 will be displayed. This page includes a company logo 301, and several picture icons 302, 304, 306, 308 that correspond to various categories of travel offerings with related pages available at the site. Adjacent to the picture icons are text blocks 310, 312, 314, and 316 that are respectively paired with a corresponding picture icon and its associated category. Not visible are hyperlinks to each of the pages referenced by the picture icons/text blocks. To simplify the following explanation, the reference numbers for text blocks 310, 312, 314, and 316 will be assumed to also refer to their associated hyperlinks.

Homepage 300 is at the top level of the content hierarchy for the web site referenced by www.traveltickets.com. There is a "nested" page for each of the travel categories that can be reached by either clicking one of the picture icons or one of the text blocks, both of which are associated with one of the hyperlinks. For instance, clicking on either icon 304 or text block 312 will link the browser to a Cruises page 318, causing the Cruises page to open in the browser. Cruises page 318, and the pages associated with the other travel categories (e.g., an Air Travel page, a Trains page, etc., (none of which are shown)) are all nested at a second level of the content hierarchy. As with homepage 300, Cruises page 318 also contains hyperlinks pointing to pages that are nested below it. These hyperlinks are associated with picture icons and text block pairs, including an "Alaska" icon/text block 320, a "Caribbean" icon/text block 322, a "Puerto Rico" icon/text block 324, and a "Mexico" icon/text block 326. Each of these icon/text block pairs and their associated hyperlinks can be used to access specific pages at a third level of the content hierarchy. For instance, clicking on "Caribbean" icon/text block 322 activates the associated hyperlink that links the browser to a Caribbean Cruise page 328, which contains detailed information about a Caribbean cruise for which the user can purchase tickets at the web site. There are similarly nested detailed information pages for the other cruise destinations (Alaska, Puerto Rico, Mexico— none shown), which can be accessed by the user activating the respective hyperlink associated with the icon/text block for that page.

Clicking on the "I Want to Go!" button 330 activates another hyperlink (not visible) that loads a ticket reservation page in the browser. The ticket reservation page (not shown) displays travel dates, accommodation options, pricing information, and payment information, etc. Since the same ticket reservation page can be accessed from the other third level pages (e.g., from a Mexico Cruise page), the ticket reservation page is not nested below the third level pages, but rather is located below the homepage on the second level of the content hierarchy.

Each of the pages (documents) on a web site is typically stored as an individual HTML file on the web site's server. The HTML files are usually stored in a file hierarchy that is similar in structure to the content hierarchy. Such a file hierarchy is schematically shown in the block diagram of FIG. 9A. All of the documents are stored in either in a root directory or folder, or subdirectories or subfolders thereof. For example, the HTML files for the travel agency site are stored in a root folder 332 having a location on the server represented by the path "H:\server\travel." The HTML homepage document for a site is commonly stored on the web server in the root folder, and generally has a special name such as "index.htm" or "default.htm" so that the web server can identify it as the homepage. For instance, homepage document 331 for the travel agency site is stored in root folder 332 as "index.htm." The HTML documents that correspond to the nested web pages are typically located in subdirectories (or subfolders) that are nested at one or more levels below the root directory. For example, an "index.htm" HTML document 333 used for displaying Cruises page 318 is stored in a cruises subfolder 334 (i.e., stored on the server as "H:\server\travel\cruises\index.htm"), as well as a "caribbean.htm" HTML document 335, which is used to display the Caribbean Cruise page (and stored on the server as "H:\server\travel\cruises\caribbean.htm"). There are additional subfolders corresponding to the different travel categories, including an air travel subfolder 336, a trains subfolder 338, and a tours subfolder 340. Each of subfolders 334, 336, 338, and 340 contains one or more HTML documents corresponding to the content hierarchy of the site. By storing the web pages in a hierarchy that corresponds to the web site content, the web server can more easily locate and cache web pages, thereby improving web site performance.

There are two primary schemes used for mapping URLs to their corresponding Internet resources. The first scheme uses an indirection table with entries that tie or map a URL to each resource. For example, suppose that the HTML document for Caribbean Cruise page 328 is stored as H:\server\travel\cruises\caribbean.htm. The indirection table would contain a URL entry corresponding to this file on the server, such as "http://www.traveltickets.com/cruises/caribbean.htm", or alternately, there might be an entry of for a URL "base/cruises/caribbean.htm." When the server receives a message from a client requesting a resource via its URL reference, the server looks up the location of the resource in the indirection table, and then forwards a copy of the resource to the client. A new indirection table entry is added as each new page is created. As documents are moved or deleted, their indirection table entries must be updated.

An advantage of the indirection table scheme is that URLs do not have to be changed when documents are moved. Once a URL for a resource is created, it generally does not have to be changed, unless the resource is moved to a different server, whereupon the name for the host (server) would be different from the name of the previous server on which the document was stored, requiring a change in the document's URL. This scheme is preferable, since it allows a web site author to move documents around (within the file hierarchy) without breaking any external hyperlinks to the moved documents.

Unfortunately, this advantage comes at a price. In order to use an indirection table scheme, the server must run a program that maps URLs to the appropriate resources. This mapping step adds overhead to the work that the server already must perform. Furthermore, allowing files to be randomly located within the file hierarchy may lead to increased file retrieval latencies. Another drawback is that the indirection table must reside at a single location, leading to site failure if the indirection table becomes corrupted. These problems are even more pronounced when the web site has numerous documents, such as an on-line retail site.

For these and other reasons, most web servers use a second scheme for mapping URLs to resources. This scheme is based on the underlying structure of the server's file hierarchy. Recall from above that each URL reference is of the form "http://<host>:<port>/<path>?<searchpart>." The host is mapped to a physical address, such as the address for the web server, so it will always be the same for web sites that have all of their files stored on a single server. Likewise, under HTTP, the port value will normally be the default value (80), which doesn't need to be entered as part of the URL. Therefore, the only portions of the URL of concern are the <path> portion and the ?<searchpart> portion. While both are optional, the latter is generally not used, so it is necessary to only consider the <path> portion for designating the location of the resource. For convenience, the part of the path relative to (below) the root is used for each file as the <path> for its associated URL, thereby forming a relative reference scheme.

Figure 9A:
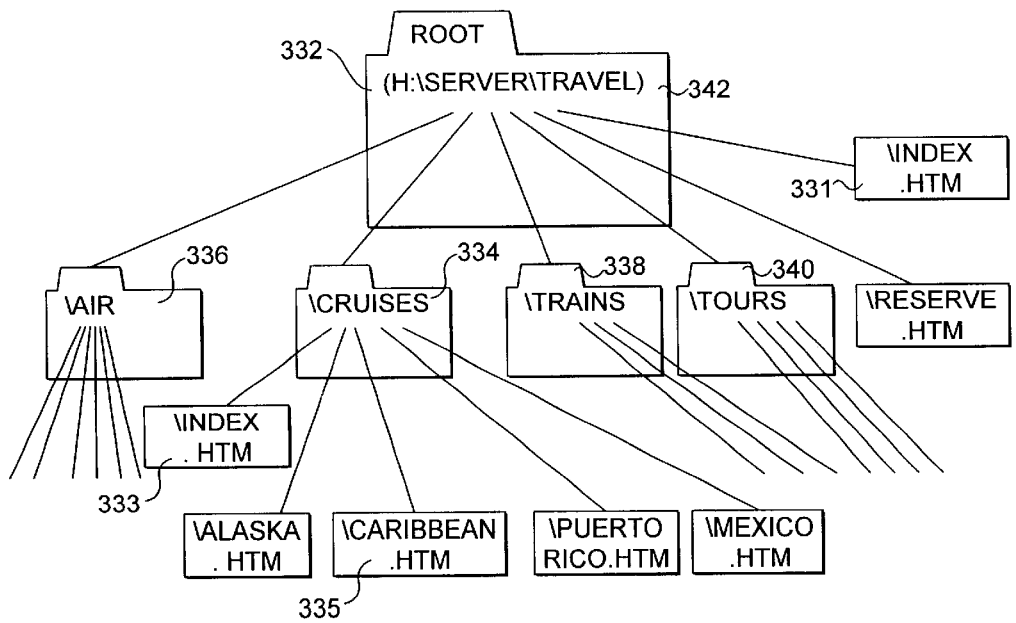
FIG. 9A illustrates the file structure of the web site shown in FIG. 8.
Figure 9B:
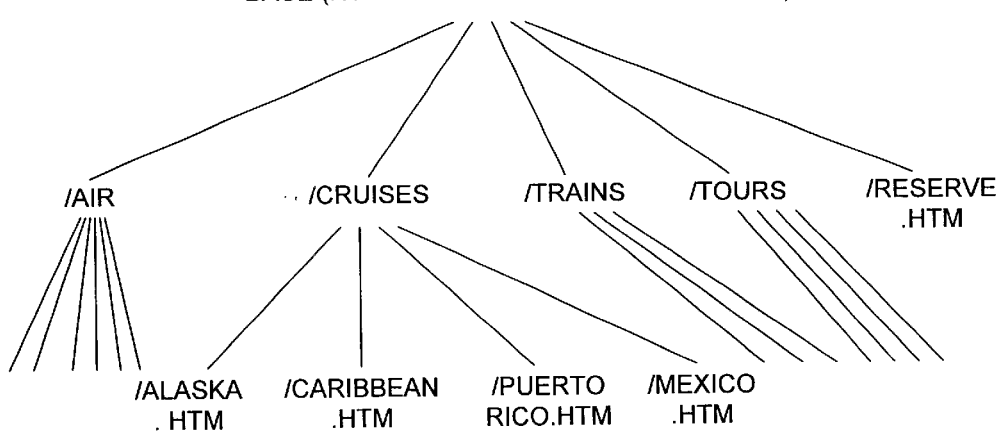
FIG. 9B illustrates the URL structure of the web site shown in FIG. 8.

FIG. 9B shows a relative reference URL structure corresponding to the file structure shown in FIG. 9A. Note that the elements of both figures are nearly identical, with a few exceptions. One exception is that that the file structure starts with a root address 342 at its top, while the URL structure starts with a URL base 344 at its top. Another exception is that both "index.htm" HTML documents 331 and 333 are referenced by their indexed source, and seem to "disappear" into the hierarchy. Actually, the "index.htm" HTML document 331 corresponds to homepage 300, and therefore its URL is the URL for the web site (http://www.traveltickets.com). Similarly, "index.htm" HTML document 333, which displays Cruises page 318, is referenced by the URL "http://www.traveltickets.com/cruises" —it has "disappeared" into the "/cruises" portion of the structure. URL base 344 is simply "http://<host>", wherein <host> is the name of the site's server in its domain. The travel agent example web pages in FIG. 8 contain URLs that follow this scheme, including URL 346, which refers to homepage 300, URL 348, which refers to Cruises page 318, and URL 350, which refers to Caribbean Cruise page 328.

It is common for web site authors to continually add, move and/or delete content. For example, the author of a news site may archive pages containing older news stories once a month, moving them into an "archive" section of the site. Accordingly, the HTML documents corresponding to the pages are moved into an "archive" subfolder on the web site's server. When using the URL file structure scheme, it is necessary to update the URL to point to the new location of the document after they are moved. Additionally, internal hyperlinks within the web site must be updated with the new URL.

Figure 1:
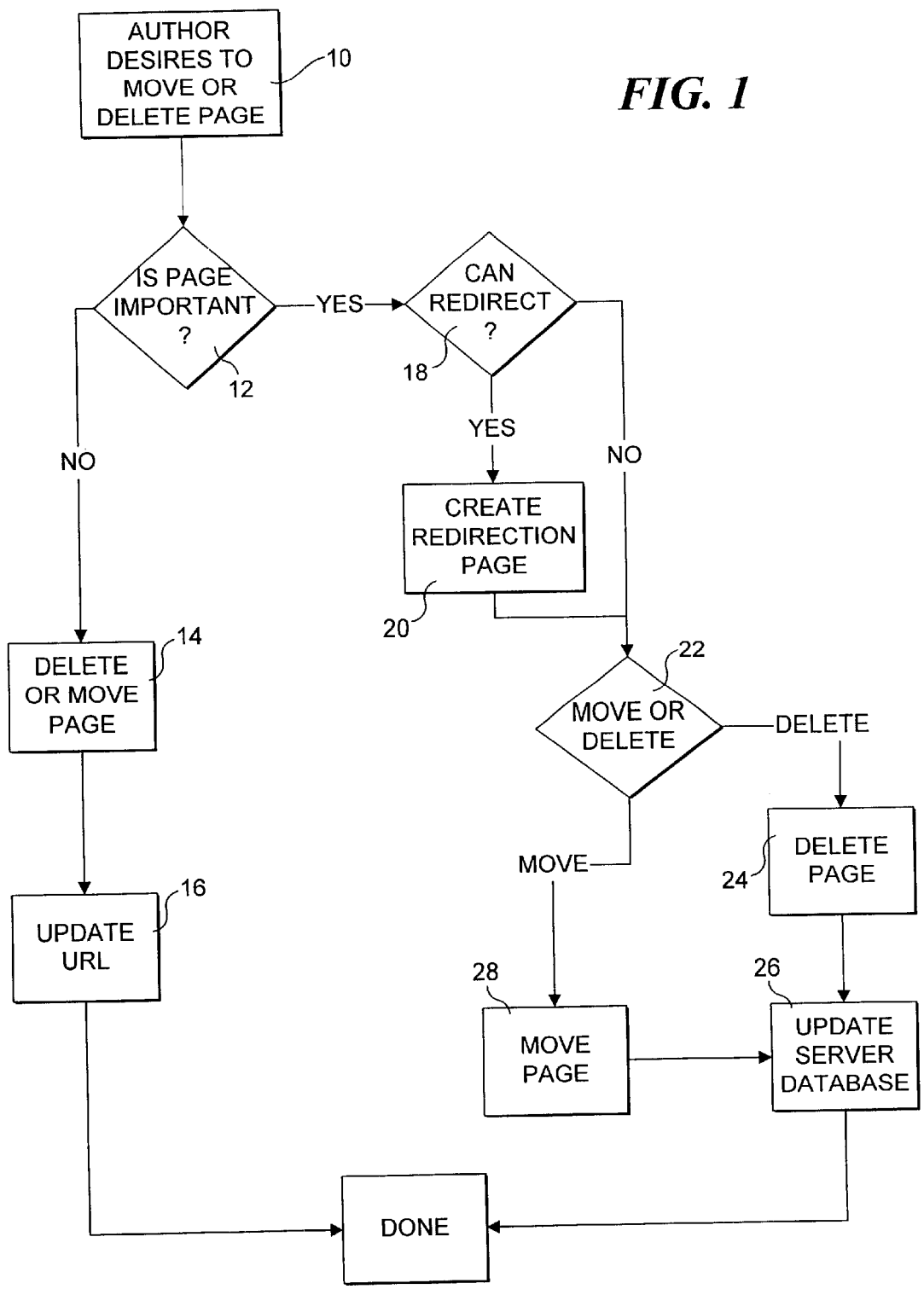
FIG. 1 is a flow chart illustrating the logical steps implemented by a Referential Preservation Engine in accord with the present invention, when a page on a web site is moved or deleted.

FIG. 1 shows a flow chart illustrating the logical steps the RPE uses when a web site author moves or deletes a page on a web site. As used in the following discussion, the term "page" is intended to include any resource that is capable of being referenced by a hyperlink in an HTML document, including but not limited to: other pages, images, script, text, audioclips, database resources, and executable code. The process is initiated in a block 10, which indicates to the RPE that the web site author desires to move or delete one of the site's pages. In a decision block 12, a determination is made to whether the page is important or not, based on predetermined rules or criteria that are discussed below. Assuming that a page is important, it will meet these predetermined rules or criteria, so that providing redirection data for the page is justified. If the page is not important, i.e., does not meet these predetermined rules or criteria, the page is merely deleted or moved (by the file system based on the user's request), as noted in a block 14, and the URL is updated in a block 16, as appropriate, and the process is complete. If a file-based URL mapping scheme is used the URL update is automatically performed by the server. For instance, suppose an unimportant page is moved, i.e., the file containing the page's HTML content is moved within the web site file structure, a corresponding change to the page's URL will be made, such as changing the URL from "http://server/oldlocation.htm" to "http://server/newlocation.htm." Once the file is moved, the links to the page within other documents or pages on the web site are also updated to point to the new file location.

If block 12 determines that the page is important, the logic queries to determine if the link can be redirected in a block 18. Moved pages can generally be redirected, while deleted pages have no page to which automatic redirection is applicable; however, the author may create a redirection reference for a deleted page and request it to be implemented by the server. If the page can be redirected, a redirection page is created in a block 20. The redirection page contains a URL stub file that automatically redirects the browser to the new URL, without requiring the user to perform any steps. Optionally, the stub file can cause the browser to display a message indicating that "This page has been moved," along with updating the hyperlink to the new URL. The message can be displayed for a predetermined period of time before loading the page from the new location referenced by the updated URL. In the case of automatic redirection, a user accessing the document on the web site will be unaware that the URL has changed, except that the new URL will replace the previous URL on the location bar in the browser as the new location is being accessed to load the document.

The following is an example of the content of an HTML stub file used for redirecting a URL.

1. <HTML>
2. <HEAD>
3. <TITLE>Main Page</TITLE>
4. <meta HTTP-EQUIV="refresh" content="15; URL=newURL">
5. </HEAD>
6 <BODY>
7. <P><A HREF="linked.htm">Link to new page </A></P>
8. </BODY>
9. </HTML>

Line 4 in the above example contains the HTML code to automatically redirect the URL. In particular, the portion "15; URL=newURL" specifies that the page corresponding to the old URL should be displayed for 15 seconds before automatically forwarding to the page at the new URL. The "newURL" value would actually be a complete URL. It may comprise either a full (path) URL or a relative path portion URL. Line 7 contains the HTML code for the hyperlink for the new URL.

In a decision block 22, a decision is made to whether the page is to be deleted or moved. If the page is to be deleted, it is deleted as noted in a block 24, and the server database is updated so that the previous URL for the link is marked to indicate the page has been deleted in a block 26. If the page is to be moved, the content of the page is moved to a new location in a block 28. A corresponding change to indicate the page's new URL is made in the server database in block 26. The structure of the server database is described in detail below.

Figure 2:
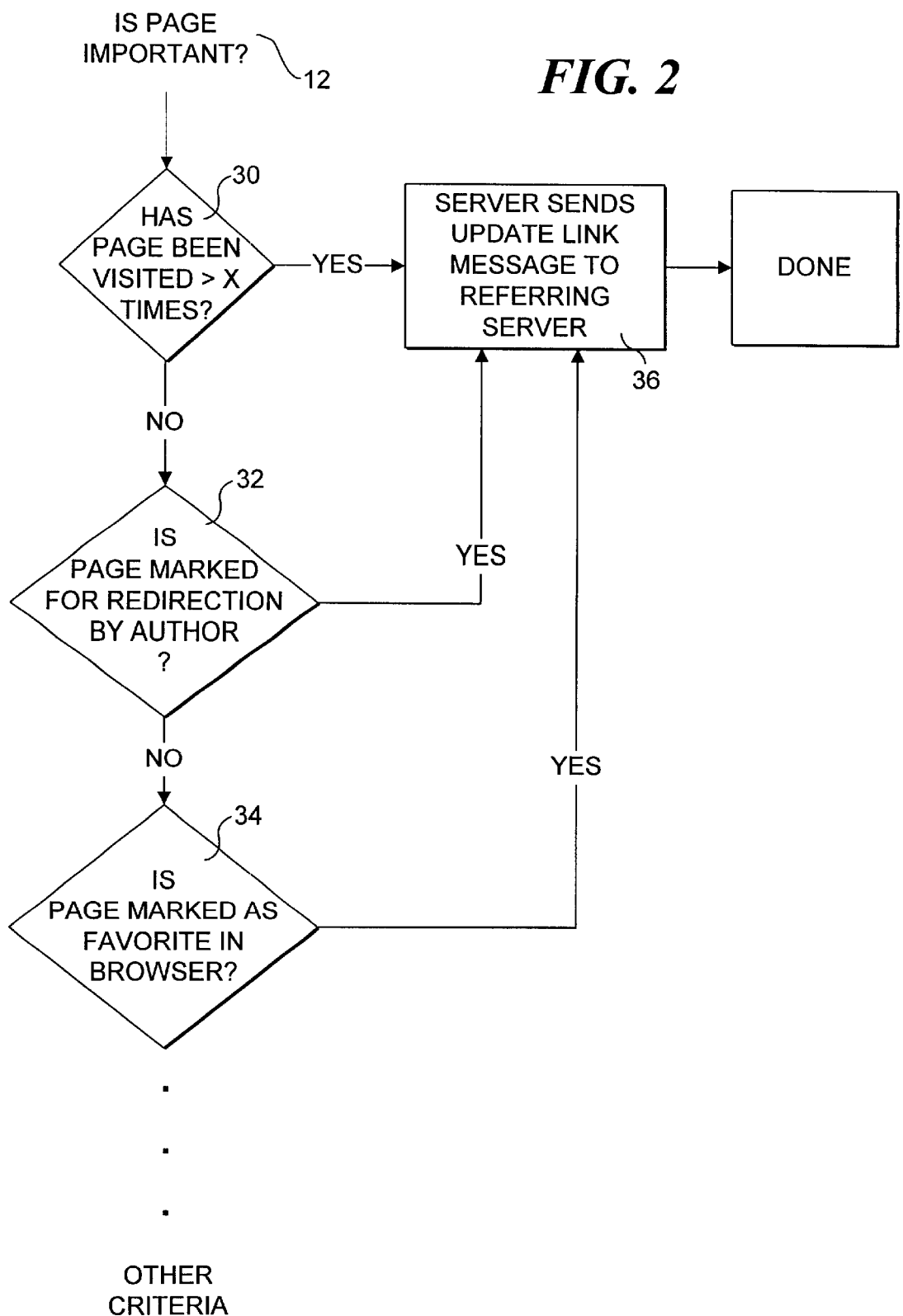
FIG. 2 shows a flow diagram for applying predefined rules to determine if redirection data should be maintained for a document or web page.

FIG. 2 illustrates a flow chart showing the logic used to determine if a page is important. This flow chart shows three decision blocks 30, 32, and 34. The order of the queries made in these decision blocks is not important, as an affirmative answer to any of the queries indicates that the page is important, so that maintaining redirection data for the page is justified.

In decision block 30, a query is made to determine whether the page has been visited more than a minimum number of times, "X". It is common for web site servers to record the number of times individual pages are "hit," or accessed by browsers. Additionally, each hit may cause the address of the server from which the address was referred to be recorded by the web site server on which the page being accessed is stored. For instance, a user may have navigated to the web page through a hyperlink in a different web page that is part of a web site stored on another web server. The value of X in decision block 30 may be from one to any predefined number. Alternately, the criteria may be specified as a predetermined minimum rate of hits, such as ten hits per week.

In decision block 32, a query is made to determine if the page has been marked as important by the author, i.e., marked for redirection. In many instances, a web site may contain pages written by several different authors. In such a case, a single site supervisor may have the authority to move and delete the various pages. The system provides the ability for individual authors to mark pages they have created as being sufficiently important to justify redirection data being maintained for the page.

Figure 3A:
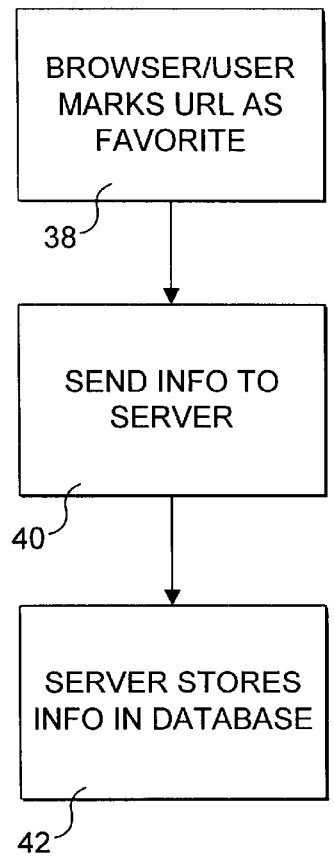
FIG. 3A is a flow diagram illustrating the steps that the Referential Preservation Engine executes when a user marks a URL as a favorite.
Figure 3B:
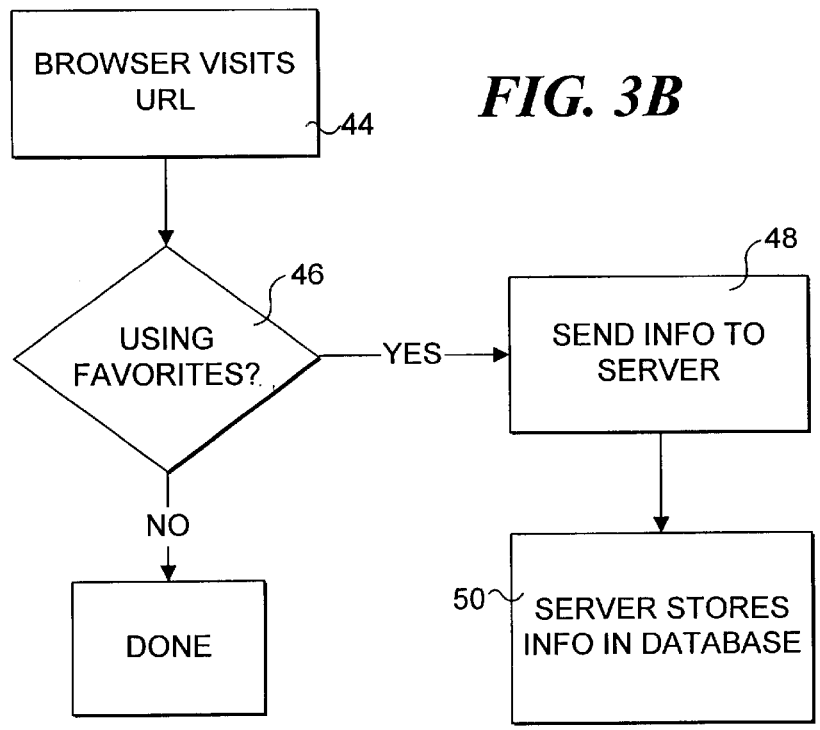
FIG. 3B is a flow diagram illustrating the steps the Referential Preservation Engine executes when a user employs a favorite URL to reach a web site or page.

In decision block 34, a query is made to determine if the page has been marked in a browser as a favorite site. To enable this criteria to be considered, the user's browser must have the ability to indicate to the web site server that the user has marked the site or page as one of the favorites of that user. FIG. 3A shows the applicable steps that are executed when a user marks a site or page as a favorite in a browser. When the URL is marked as a favorite in a block 38, the client (the user's) computer sends information to the web site server that the URL has been marked as a favorite in a block 40, and the server stores the marked as favorite information in the web site's database in a block 42. Alternately, as shown in FIG. 3B, the user may reach the site through a previously stored favorite mark. When the user visits the URL in a block 44, a query is made to determine if a favorite URL was used to reach the web resource in a decision block 46. If the answer is yes, the client computer sends information to the web site server indicating that the URL is a favorite in a block 48, and the server stores the favorite URL use information in the web site's database in a block 50. A running count of favorite markings and uses for each page is recorded in the server's database. Furthermore, the marking or use data may also include the address of the client that made the mark (i.e., a mapping to the client computer). This can be done by using the http request IP address, or through the use of cookies, etc. As with decision block 30, a yes or no determination can be based on a single mark, a predetermined minimum number of marks, or a predetermined minimum rate of marks as favorites received for a given page. In addition to the foregoing criteria used in decision blocks 30, 32, and 34 in FIG. 2, other criteria (not defined here) may also be considered to determine whether the page is important and should have redirection data maintained for it.

If an affirmative answer is determined for any of decision blocks 30, 32, and 34 (or other criteria), the server sends an update link message to the referring server in block 36, if applicable. (In the case of a page marked for redirection by its author, there will be no referring server). The update link message forwards data that includes the page's new URL and former URL to the referring server and the hyperlinks on the referring server are updated with the new URL.

Figure 4:
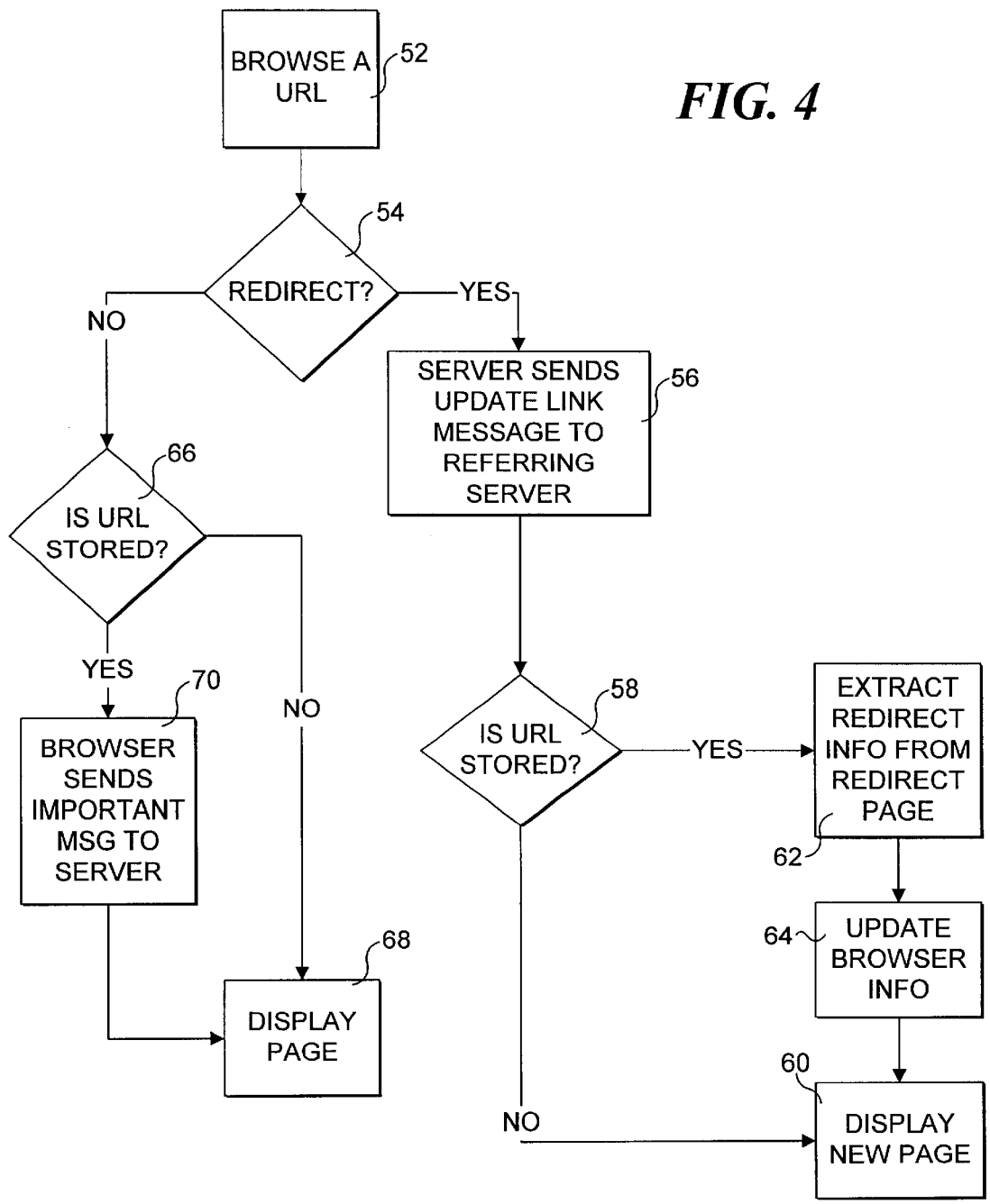
FIG. 4 is a flow diagram illustrating the steps that the Referential Preservation Engine executes when a user browses a URL under various conditions.

The invention also provides additional ways to update URLs and their associated links. Referring to FIG. 4; in a block 52, a user browses a URL by typing in the URL, selecting a favorite that references it, or by clicking on a hyperlink in a document or page, etc. A decision block 54 determines if the URL has been redirected. In addition to the URL stub file, there is additional redirection information that is part of the database, as discussed below. If the URL has been redirected, then the web site server sends the referring server a message that includes the new URL for the link so that the hyperlinks on the referring server may be updated in a block 56. The code for updating the hyperlinks on the referring server is contained in another RPE that resides on the referring server. Next, a decision block 58 queries to determine if the URL is stored (e.g., saved on a user's computer as a favorite or in a history list). If the URL is not stored, the page corresponding to the new (redirected) URL is displayed in a block 60. If the URL is stored, then the redirection information is extracted from the redirect page in a block 62, a message containing the extracted redirection information is sent to the user's computer to update the URL stored in the browser in a block 64, and the page is displayed in the user's browser in a block 60. This is all performed by the browser, without requiring client/server communication. In order to update the URL in the browser, it will be necessary for the browser to include a feature that enables the server to write data to one or more of the browser's files on the client computer, which is handled by RPE functionality that is implemented in the browser.

If decision block 54 determines that the URL has not been redirected, then the logic flows to a decision block 66, where a query is made to determine if the URL is stored, similar to the determination discussed above for block 58. If the URL is not stored, the web page is displayed in the browser in a block 68. If the URL is stored, the browser sends a message to the web site server that the URL for the page has been marked as a favorite in a block 70 and the web page is displayed in a block 68.

The Referential Preservation Engine Database

As discussed above, the information concerning various page parameters, such as URL changes, is stored in a database. The structure of the preferred embodiment of the database is different from the structure typically associated with databases, because the content of the database is not stored in a single file, but rather combines files for each page and for the file hierarchy. Other conventional forms of databases could also be implemented to serve the database function.

Each web document has an associated contextual information file that is stored in a "_vti_cnf" subfolder that shares the same folder or subfolder as the document. For instance, in the foregoing example, there is a _vti_cnf subfolder stored within the same folder as main.htm and linked.htm. The contextual information file comprises a set of "meta-data" that include parameters relating to the resource, such as the last time the resource was modified, the author's name, the size of the resource, etc., and back link information so that hyperlinks in referring documents can be updated to map to the new location for a moved document.

Figure 9C:
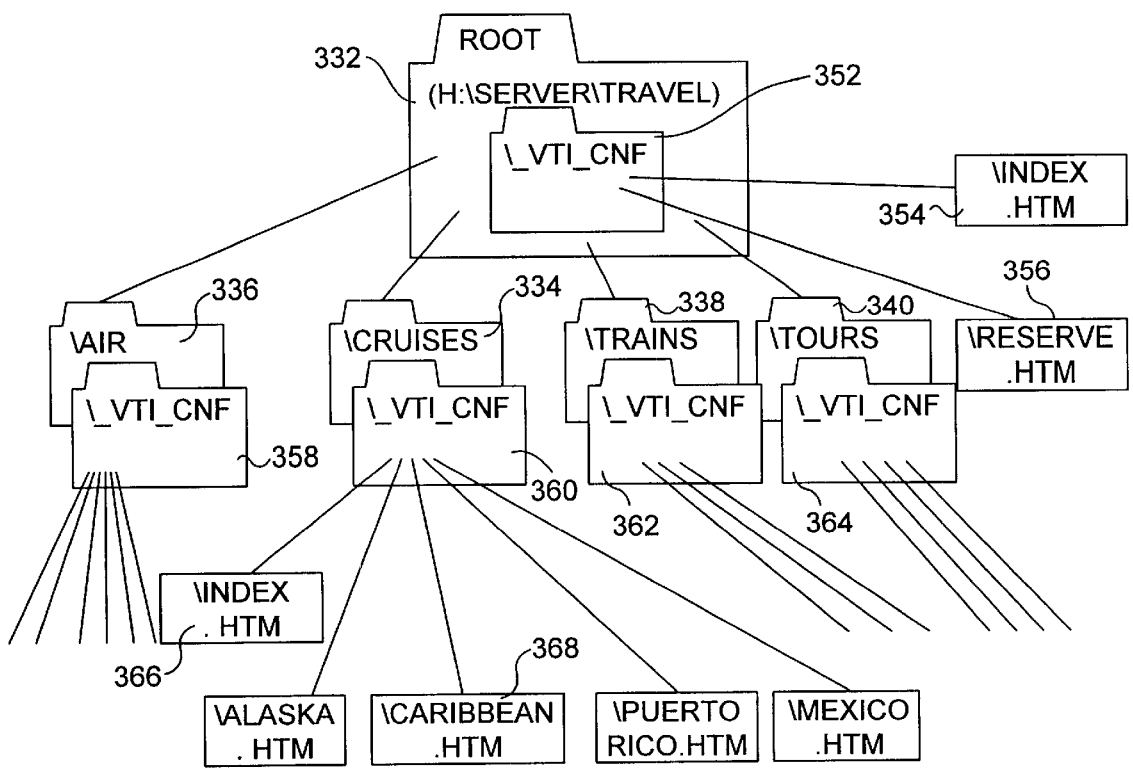
FIG. 9C illustrates the file structure of the meta-data files that correspond to various documents that comprise the web site shown in FIG. 8.

FIG. 9C shows the file structure hierarchy of the contextual information (meta-data) files corresponding to the travel agency web site. The contextual information files are stored in subfolders called _vti_cnf subfolders that are stored within the same folders as the HTML documents they correspond to, wherein each contextual information files share the same name as its corresponding HTML document. For example, root folder 332 contains a _vti_cnf subfolder 352, which includes an "index.htm" contextual information file 354 that corresponds to "index.htm" (homepage) HTML file 331. The _vti_cnf subfolder contains additional contextual information files for corresponding HTML documents that are located in root folder 332, such as a "reserve.htm" contextual information file 356.

In a similar manner, each subfolder in the HTML file hierarchy contains a _vti_cnf subfolder including contextual information files that correspond to the HTML files in the HTML document subfolder. These contextual information files include a _vti_cnf subfolder 358 (containing information relating to files in air travel subfolder 336), a _vti_cnf subfolder 360 (containing information relating to files in cruises subfolder 334), a _vti_cnf subfolder 362 (corresponding to trains subfolder 338), and a _vti_cnf subfolder 364 (containing information relating to files in tours subfolder 340). The _vti_cnf subfolders 358, 360, 362, and 364 each contain one or more contextual information files corresponding to the HTML documents in their parent folder. For example, _vti_cnf subfolder 360 contains an "index.htm" contextual information file 366 corresponding to "index.htm" HTML file 333, and a "caribbean.htm" contextual information file 368 corresponding to "caribbean.htm" HTML file 335. These files, along with the file hierarchy of the web site documents, comprise the "database" for the web site. The following example will clarify how the database functions.

Consider two pages, main.htm and linked.htm that are stored in the same folder (i.e., a subdirectory nested under the root directory for the web site). Abstracted representations of the content of main.htm and linked.htm are as follows:

main.htm
1. <HTML>
2. <HEAD>
3. <TITLE>Main Page</TITLE>
4. </HEAD>
5. <BODY>
6. <P><A HREF="linked.htm">Link to other page</A></P>
7. </BODY>
8. </HTML> linked.htm
1. <HTML>
2. <HEAD>
3. <TITLE>Linked page</TITLE>
4. </HEAD>
5. <BODY>
6. <P>Linked page</P>
7. </BODY>
8. </HTML>

Line 6 of main.htm contains a hyperlink reference to linked.htm: Line 6 of linked.htm contains a markup indicating that another document within the web site contains a link to the linked.htm page. In this particular instance, two files called main.htm and linked.htm, corresponding to the "real" page main.htm are stored in the __vti__cnf subfolder. Although these files share the same name as those above, they are not written in HTML. Rather, these files contain a set of "meta-data" that is used by the RPE in performing its functions. The __vti__cnf/linked.htm file includes the following meta-data entries:

1. vti__encoding:SR|utf8-nl
2. vti__author:SR|mdsmith
3. vti__modifiedby:SR|mdsmith
4. vti__timecreated:TR|02 Feb 1999 20:22:53-0000
5. vti__timelastmodified:TR|02 Feb 1999 20:22:53-0000
6. vti__cacheddtm:TX|02 Feb 1999 20:22:53-0000
7. vti__filesize:IR|358
8. vti__cachedlinkinfo:VX|
9. vti__cachedsvcrellinks:VX|
10. vti__cachedtitle:SR|Linked page
11. vti__title:SR|Linked page
12. vti__cachedbodystyle:SR|<BODY>
13. vti__cachedhasbots:BR|false
14. vti__cachedhastheme: BR|false
15. vti__cachedhasborder: BR|false
16. vti__metatags:VR|HTTP-EQUIV=Content-Language en-us HTTP-
17. EQUIV=Content-Type text/html;\\charset=windows-1252 GENERATOR
18. Microsoft\\FrontPage\\4.0 ProgId FrontPage.Editor.Document
19. vti__progid: SR|FrontPage.Editor.Document
20. vti__generator:SR|Microsoft FrontPage 4.0
21. vti__extenderversion:SR|4.0.2.2505
22. vti__backlinkinfo:VX|main.htm The meta-data entries may also include page-usage information, such as a count of the number of times a particular document is requested and/or an entry indicating that the page is marked as a favorite.

Suppose that linked.htm is renamed to changed.htm. The following pseudocode illustrates the logic executed by the RPE to implement the renaming of linked.htm.

1. rename /linked.htm to /changed.htm
2. rename /__vti__cnf/linked.htm to /__vti__cnf/changed.htm
3. look in /__vti__cnf/changed.htm to see if there's any files listed in
4. vti__backlinkinfo (line 22 above). If there is
5. for each file in vti__backlink info
6. search the actual file (in this case there's only one - /main.htm)
7. change the actual HTML to reflect the change (in this case that
8. means altering the line <P><A HREF= "linked.htm">Link to
9. other page</A></P> to <P><A HREF= "changed.htm">Link to
10. other page</A></P>
11. end for each Lines 1 and 2 respectively rename the HTML file and the __vti__cnf subfolder file. In line 3, a search is conducted to determine if there are any backlinked files. A backlinked file is a file that contains a hyperlink to the document being moved. In this case, there is a single backlinked file, main.htm. As shown by lines 5–11, modifications are made for each backlinked file. The backlinked file is searched to find the original hyperlink code. Once the hyperlink code is found, it is updated to reflect the new location for the document.

As discussed above, the RPE can also fix broken hyperlinks contained in web pages on a local server that are linked to web resources on external web servers. As a site is being used, information stored as meta-data is compiled concerning the usage of various pages within the site, including a compilation of external servers that store web pages with hyperlinks to pages on the site, such as the referring server information discussed above. When a hyperlink is changed on a web site that is built with the RPE, the RPE can automatically send meta-data to external servers based on this compiled information. Similarly, referring server information can be compiled on external sites that are maintained by a web authoring environment that also uses the RPE. Thus, when hyperlinks within these externally stored pages change, the external server can forward the changes as meta-data to the local server, whereupon a web page author or site administrator at the local site can run an RPE link fixup routine to update the hyperlinks so they correctly point to the new URLs. Alternately, the server may be configured for automatic RPE link fixup so that it fixes the URLs when it receives the update information from external servers. This would be especially advantageous for search engines.

As discussed in the Background of the Invention, it is very important that external servers not have the ability to change files on a local server without permission. Thus, the external server must establish a two-way communication link with the RPE on the local server to change the meta-data stored on the local server. Optionally, the external server may send messages to the local server containing the meta-data, whereupon the local server can decide how to implement the meta-data to update the hyperlinks on its local web pages.

Figure 5:
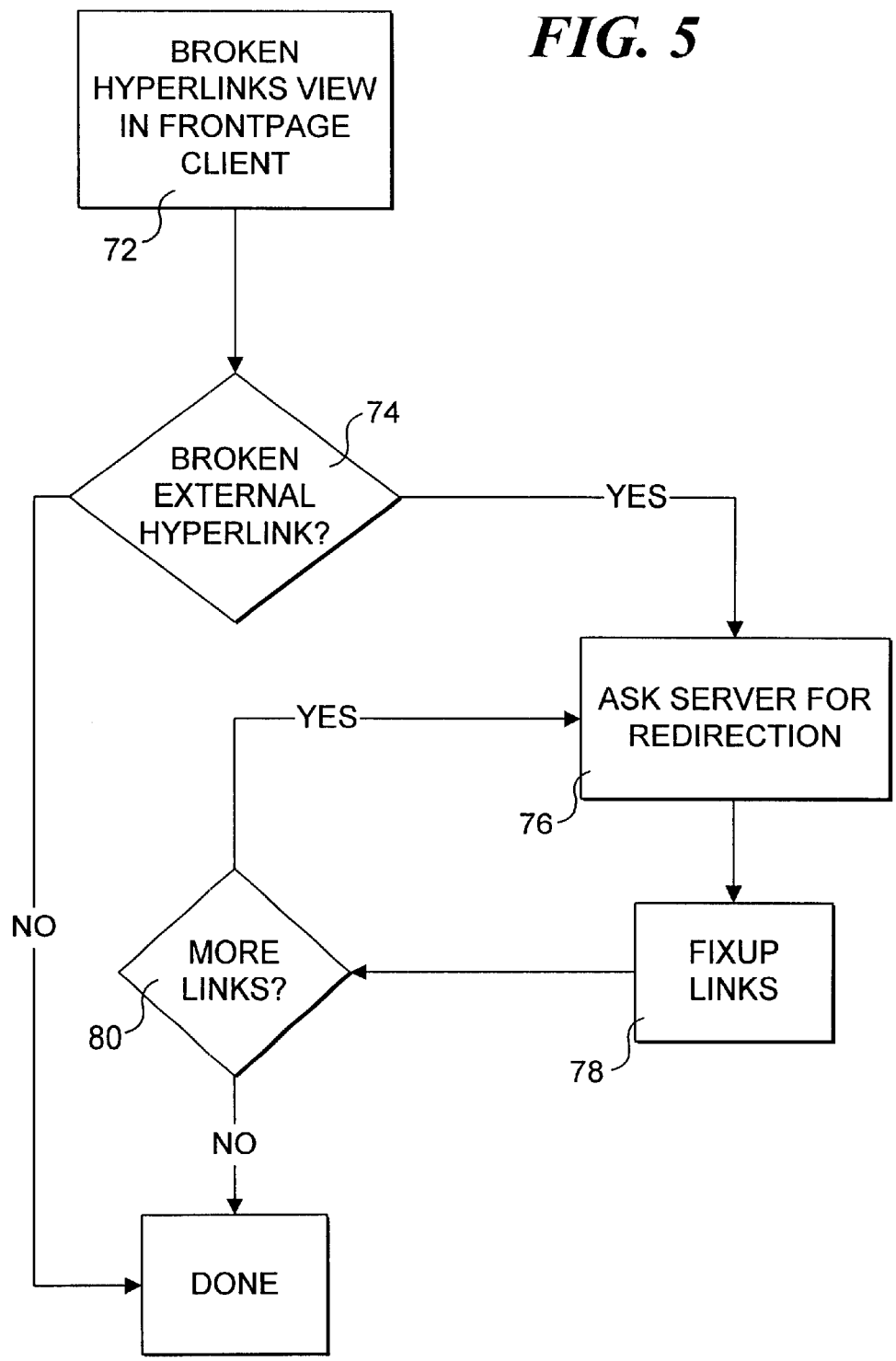
FIG. 5 is a flow diagram illustrating the steps that the Referential Preservation Engine executes when it fixes broken external hyperlinks.

With reference to FIG. 5, the user (e.g., site administrator) initiates the link fixup process by, e.g., entering the broken hyperlinks view in the FRONTPAGE™ client in a block 72. The FRONTPAGE™ client examines the links to determine if any of the broken hyperlinks are external, based on the URL update information meta-data passed to the local server from external servers in a block 74. If any broken external hyperlinks are detected, the meta-data is examined for the links in a block 76, and the hyperlink URLs in the local web pages that refer to the broken hyperlink are updated to contain the new URL in a block 78. A decision block 80 queries to determine if there are any additional external broken hyperlinks, and the logic in blocks 76 and 78 is repeated until all of the broken external links are fixed.

Exemplary Operating Environment

Figure 6:
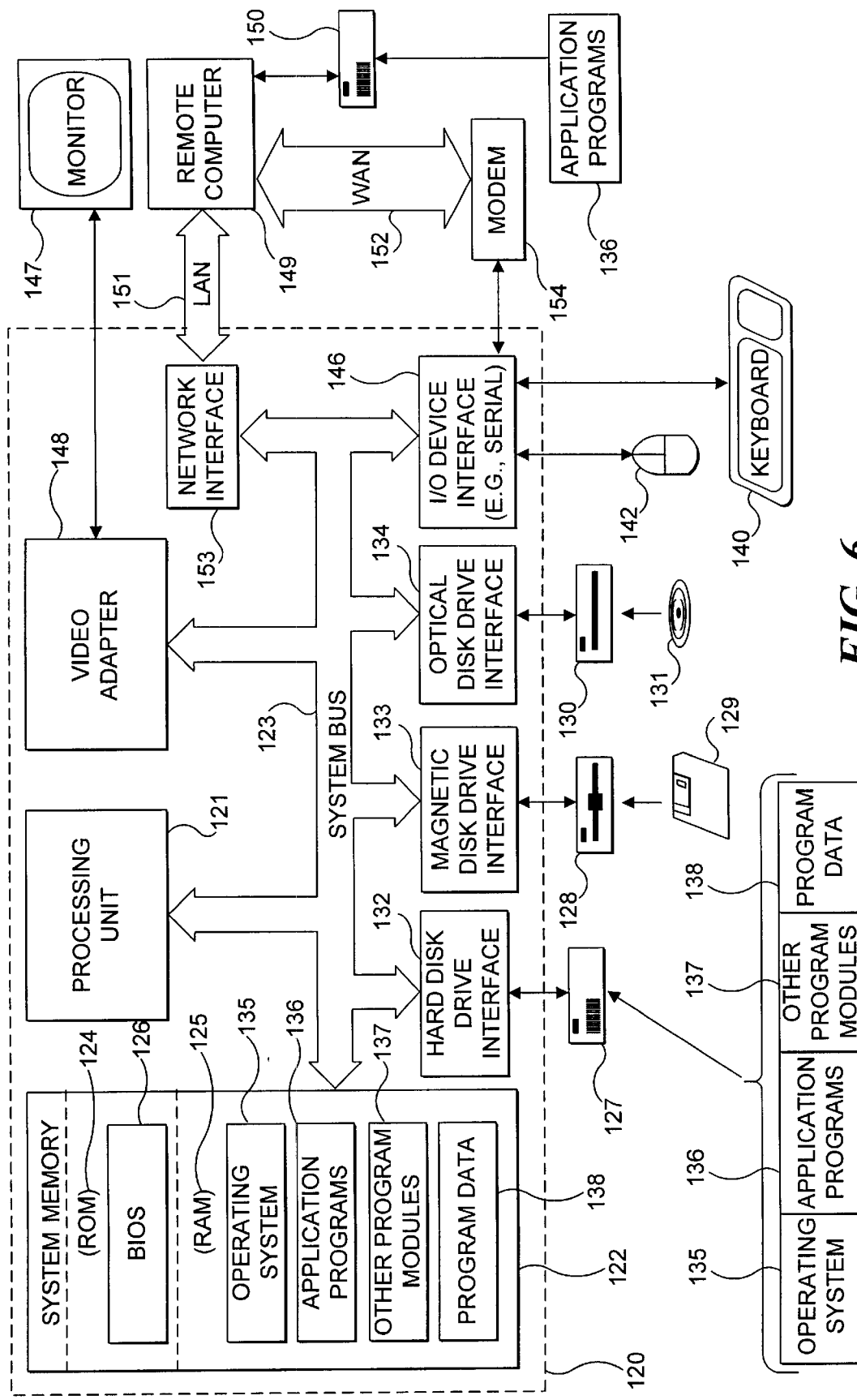
FIG. 6 is a block diagram of a personal computer system for implementing the present invention.

FIG. 6 and the following discussion are intended to provide a brief, general description of a suitable computing environment in which the invention may be implemented.

As discussed above, the Referential Preservation Engine is preferably implemented as part of an application program in a web-authoring environment, wherein the application program is executed by a personal computer or workstation. The application program comprises a plurality of program modules that include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 6, an exemplary system for implementing the invention includes a general purpose computing device in the form of a conventional personal computer 120, including a processing unit 121, a system memory 122, and a system bus 123 that couples various system components including the system memory to processing unit 121. System bus 123 may be any of several types of bus structures including a memory bus or memory controller, a peripheral bus, and a local bus using any of a variety of bus architectures. The system memory includes a read only memory (ROM) 124 and random access memory (RAM) 125. A basic input/output system (BIOS) 126, containing the basic routines that helps to transfer information between elements within personal computer 120, such as during start-up, is stored in ROM 124. Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively. The drives and their associated computer readable media provide nonvolatile storage of computer readable instructions, data structures, program modules, and other data for personal computer 120. Although the exemplary environment described herein employs hard disk 127, a removable magnetic disk 129, and a removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment.

A number of program modules may be stored on hard disk 127, magnetic disk 129, optical disk 131, ROM 124, or RAM 125, including an operating system 135, one or more application programs 136, other program modules 137, and program data 138. A user may enter commands and information into personal computer 120 through input devices such as a keyboard 140 and a pointing device 142. Other input devices (not shown) may include a microphone, joystick, game pad, satellite dish, scanner, or the like. These and other input devices are often connected to processing unit 121 through a serial port interface 146 that is coupled to the system bus, but may be connected by other interfaces, such as a parallel port, game port, or a universal serial bus (USB). A monitor 147 or other type of display device is also connected to system bus 123 via an interface, such as a video adapter 148. In addition to the monitor, personal computers typically include other peripheral output devices (not shown), such as speakers and printers.

Personal computer 120 may operate in a networked environment using logical connections to one or more remote computers, such as a remote computer 149. Remote computer 149 may be another personal computer, a server, a router, a network PC, a peer device, or other common network node, and typically includes many or all of the elements described above relative to personal computer 120, although only a memory storage device 150 has been illustrated in FIG. 6. The logical connections depicted in FIG. 6 include a local area network (LAN) 151 and a wide area network (WAN) 152. Such networking environments are commonplace in offices, enterprise wide computer networks, intranets, and the Internet.

When used in a LAN networking environment, personal computer 120 is connected to local network 151 through a network interface or adapter 153. When used in a WAN networking environment, personal computer 120 typically includes a modem 154 or other means for establishing communications over WAN 152, such as the Internet. Modem 154, which may be internal or. external, is connected to system bus 123 via serial port interface 146. In a networked environment, program modules depicted relative to personal computer 120, or portions thereof, may be stored in the remote memory storage device. It will be appreciated that the network connections shown are exemplary and other means of establishing a communications link between the computers may be used.

Although the present invention has been described in connection with a preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for maintaining the integrity of a hyperlink included within a document stored on a local server, said local server having an address, the hyperlink providing an original uniform resource locator (URL) reference that is mapped to an original location of a linked resource stored on a remote server, the linked resource having been moved from the original location on the remote server to a new location so as to break the hyperlink, the method comprising the steps of:

(a) compiling link redirection data for the linked resource that are stored in a location associated with the new location of the linked resource on the remote server so as to be accessible by reference to the linked resource alone, without reference to a centralized database, the link redirection data tracking movement of the linked resource on the remote server and including the original location and the new location;

(b) informing the remote server that the local server has a document that contains a hyperlink to the linked resource stored on the remote server;

(c) forwarding the link redirection data from the remote server to the local server; and (d) updating the hyperlink by changing the original URL reference to an updated URL reference, the updated URL reference being based on the redirection data and referring to the new location of the linked resource.

2. The method of claim 1, wherein the local server informs the remote server that the local server has a document stored on it that contains a hyperlink to the linked resource through a use of the hyperlink, the use of the hyperlink by the local server indicating to the remote server the address of the local server so that the link redirection data can be forwarded to the local server.

3. The method of claim 1, wherein the remote server has a domain name and the new location comprises a root directory and a path portion below the root directory, and wherein the updated URL reference comprises the domain name and the path portion.

4. The method of claim 1, wherein the remote server automatically forwards the link redirection data to the local server anytime the linked resource is moved.

5. A computer readable medium having computer executable instructions for performing the steps recited in claim 1.

6. A method for updating a uniform resource locator (URL) reference in a list managed by a client computer browser, the URL reference mapping to an original location of a linked resource on a server, the linked resource having been moved from the original location to a new location, the method comprising the steps of:

(a) storing redirection data for the linked resource that are stored in a subdirectory of the new location of the linked resource on the server so as to be accessible by reference to the linked resource alone, without reference to a centralized database, the redirection data comprising the original location and the new location;

(b) informing the server that the browser has a URL reference stored in it that is mapped to the linked resource;

(c) sending a message containing the redirection data from the server to the client computer; and (d) updating the URL reference stored in the client browser to map to the new location, based on the redirection data.

7. The method of claim 6, wherein the step of informing the server comprises the step of the client computer sending a message to the server indicating that a user of the browser has stored the URL reference as a favorite in the browser.

8. The method of claim 6, wherein the server has a domain name, the new location comprises a root directory and a path portion below the root directory, and wherein the updated URL reference comprises the domain name and the path portion.

9. A computer readable medium having computer executable instructions for performing the steps recited in claim 6.

* * * * *